(No Model.)
J. B. WILLARD.
MIRROR.
No. 500,310.        Patented June 27, 1893.
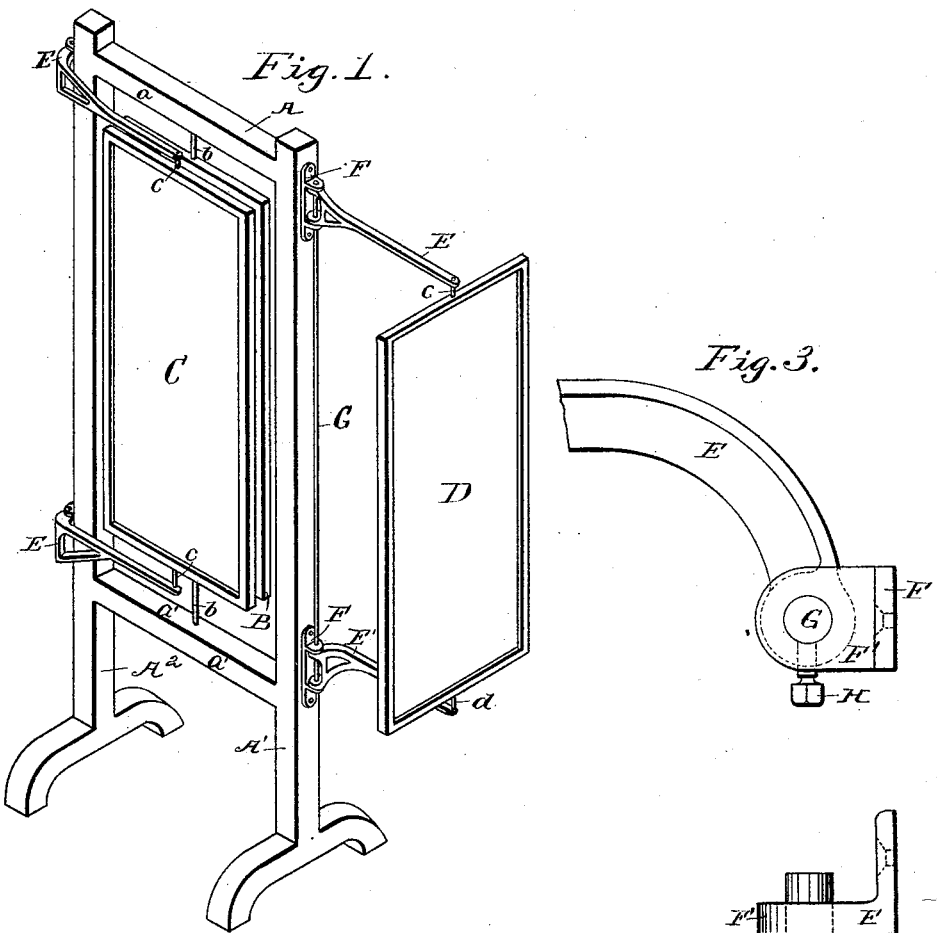
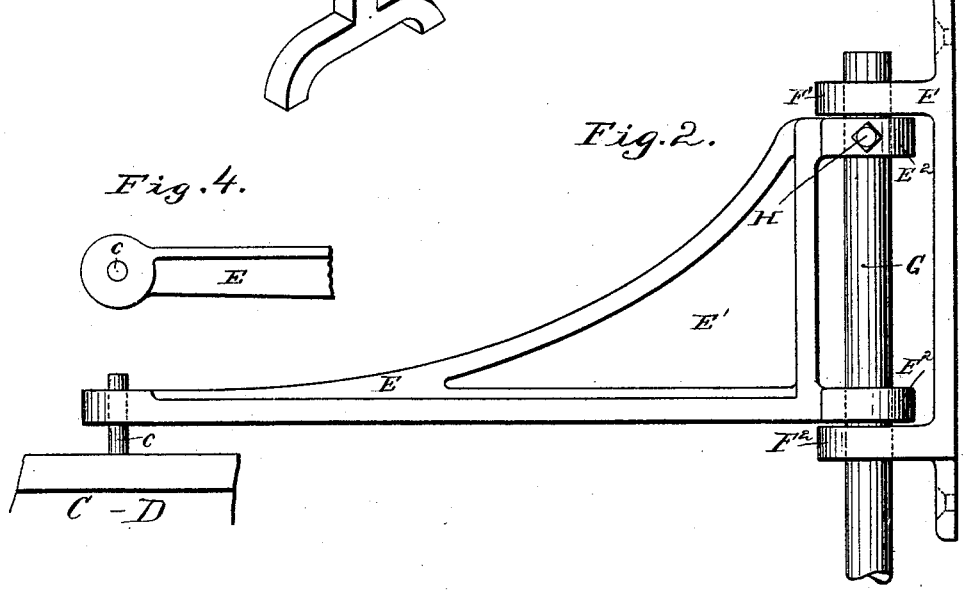
Witnesses,
Walter Framariss,
Jas. L. Skidmore.
Inventor.
John B. Willard,
By George Cook his Atty.

UNITED STATES PATENT OFFICE.

JOHN B. WILLARD, OF ALLENDALE, NEW JERSEY.

MIRROR.

SPECIFICATION forming part of Letters Patent No. 500,310, dated June 27, 1893.

Application filed February 16, 1891. Serial No. 381,737. (No model.)

*To all whom it may concern:*

Be it known that I, JOHN B. WILLARD, a citizen of the United States, and a resident of Allendale, Bergen county, and State of New Jersey, have invented certain new and useful Improvements in Mirrors; and I do hereby declare the following to be a full, clear, and exact description of the invention, such as will enable others skilled in the art to which it appertains to make and use the same, reference being had to the accompanying drawings, and to the letters of reference marked thereon, which form part of this specification.

My invention relates to an improvement in folding mirrors, whereby several mirrors of equal size may be adjusted at various angles relative to each other, and may also be reversed in varying positions, and it includes also improved hinge arms whereby the two supporting hinges of each swinging mirror are strengthened and made rigid so that the mirror supported thereby will move smoothly and without the binding of one hinge against the other.

I illustrate one application of my invention in the drawings in which—

Figure 1 is a perspective view of a triple mirror made according to my invention. Fig. 2 is a side view of one of the hinge arms. Fig. 3 is a top view of a portion of one of the hinges. Fig. 4 is a top view of the free end of one of the hinge arms E.

Similar letters of reference indicate like parts in all the drawings.

A represents a frame made of such size and strength as will support the mirrors designed to be mounted thereon, and made in plain or decorated form as may be desired.

$A'$ and $A^2$ are uprights supporting suitable cross pieces $a$, $a'$, in the frame formed by which a central mirror B, is mounted on suitable pivots $b$, $b$, the purpose of which is to enable it to be rotated at pleasure and in such manner that the mirror B may present its face or its back on either side of the frame, as may be desired.

On the side of each upright $A'$, $A^2$, a pair of hinge plates F, F, are secured by suitable screws, and these are provided with projections $F'$, $F^2$, between which the hinge arms are supported and through which a stout metal pintle rod G, passes. The hinge arms are made of strong material such as metal and consist of a straight portion E, and a curved part $E'$. The free end of the upper hinge arms is provided with a suitable opening to receive the pivot $c$, and the free end of the lower hinge arms is provided with a suitable cup in which the lower pivots $d$, are supported. The attached end of the hinge arm is enlarged and terminates in two bearing portions $E^2$, $E^2$, which are some distance apart and fit in between the projections $F'$, $F^2$, and they and the projections $F'$, $F^2$, are further provided with holes which are in line, so that the pintle rod G may be inserted through them, and the pintle rod G, is fitted to both hinges on each side of the frame, passing through the parts $F'$, $E^2$, $E^2$, and $F^2$, of the upper hinge arm and extending down the side of the frame and passing through the corresponding parts of the lower hinge arm. A screw H in each hinge passes through one of the parts $E^2$ of the hinge arm, and is screwed into a notch or hole in the pintle rod G, so that when the structure is completed, both hinge arms of the mirror, and the pintle rod G operate in connection. By this arrangement both hinge arms are thoroughly braced and stiffened, so that a heavy mirror supported by them moves with ease as they are swung or moved with it, and there is no binding or biting of parts, as when the hinges are independent of each other.

Each of the mirrors B, C, D is to be provided with a suitable back to protect it. It will be seen that by this arrangement the three mirrors can be arranged in line, so that each will present its face to the same side; that each mirror can be further rotated on its axis and each of the mirrors can be set at any angle that may be desired relative to the other mirrors; that some of the mirrors may have their faces turned to one side of the frame, while others are turned to the other side, so that several persons may use different mirrors at some distance from each other; that the central mirror B may be left in line with the frame, and the other mirrors may be turned to such an angle thereto that in standing near the central mirror the entire person, front, back and sides are fully reflected, which is a great advantage in fitting wearing apparel, or inspecting dresses, &c.; the mirrors C, D may be so closed as to occupy only the space of the stand, and have a mirror facing on each side of the stand; or a mirror facing only on one side of the stand; or the mirrors may be so rotated that when the two swinging ones are placed against the central mirror, the backs of the two outer mirrors will be exposed, and the faces of all be inclosed thereby being protected when not in use, or when the room is being cleaned, &c.

Having thus described my invention, what I claim as new, and desire to secure by Letters Patent, is—

A triplicate mirror consisting of a suitable frame, A, having a central mirror, B, pivotally disposed therein, hinge arms moving in plates secured to said frame and adjustably fixed to a vertical common pintle rod, G, passing through said arms and plates, and outer mirrors, C, D, of the same or approximately the same size as said central mirror and pivotally disposed between the outer free ends of said arms, substantially as described.

JOHN B. WILLARD.

Witnesses:
 ISAAC M. LEWIS,
 VINCENT L. NIVES.